US009957370B2

(12) United States Patent
Trummer et al.

(10) Patent No.: US 9,957,370 B2
(45) Date of Patent: *May 1, 2018

(54) METAL EFFECT PIGMENTS COMPRISING A MIXED INORGANIC/ORGANIC LAYER, METHOD FOR THE PRODUCTION OF SUCH METAL EFFECT PIGMENTS, AND USE THEREOF

(71) Applicant: Eckart GmbH, Hartenstein (DE)

(72) Inventors: Stefan Trummer, Nürnberg (DE); Frank Henglein, Nürnberg (DE); Mariel Brauer, Hamburg (DE)

(73) Assignee: ECKART GMBH (DE)

( * ) Notice: Subject to any disclaimer, the term of this patent is extended or adjusted under 35 U.S.C. 154(b) by 313 days.

This patent is subject to a terminal disclaimer.

(21) Appl. No.: 14/629,076

(22) Filed: Feb. 23, 2015

(65) Prior Publication Data
US 2015/0166760 A1 Jun. 18, 2015

Related U.S. Application Data

(62) Division of application No. 12/063,019, filed as application No. PCT/EP2006/007737 on Aug. 4, 2006, now Pat. No. 9,000,068.

(30) Foreign Application Priority Data

Aug. 5, 2005 (DE) .................. 10 2005 037 611

(51) Int. Cl.
C08K 9/00 (2006.01)
C08K 3/08 (2006.01)
C09C 1/00 (2006.01)
C09C 1/62 (2006.01)
C09C 1/64 (2006.01)
C09C 1/22 (2006.01)
C09C 1/40 (2006.01)

(52) U.S. Cl.
CPC .............. C08K 3/08 (2013.01); C09C 1/0021 (2013.01); C09C 1/22 (2013.01); C09C 1/40 (2013.01); C09C 1/62 (2013.01); C09C 1/648 (2013.01); C08K 2003/0812 (2013.01); C08K 2003/0856 (2013.01); C09C 2200/1058 (2013.01); C09C 2200/409 (2013.01)

(58) Field of Classification Search
CPC ........... C08K 3/08; C09C 1/0021; C09C 1/22; C09C 1/40
See application file for complete search history.

(56) References Cited

U.S. PATENT DOCUMENTS

| 2,885,366 | A | 5/1959 | Iler |
| 3,954,496 | A | 5/1976 | Batzar |
| 4,321,087 | A | 3/1982 | Levine et al. |
| 4,916,014 | A | 4/1990 | Weber et al. |
| 5,028,639 | A | 7/1991 | Treutleiu et al. |
| 5,194,366 | A | 3/1993 | Grubb |
| 5,332,767 | A | 7/1994 | Reisser et al. |
| 5,472,491 | A | 12/1995 | Duschek et al. |
| 5,964,936 | A | 10/1999 | Reisser |
| 6,136,083 | A | 10/2000 | Schmidt et al. |
| 6,176,918 | B1 | 1/2001 | Glausch et al. |
| 6,409,814 | B1 | 6/2002 | Bosch et al. |
| 6,706,330 | B2 | 3/2004 | Takahashi et al. |
| 6,761,762 | B1 | 7/2004 | Greiwe et al. |
| 8,980,976 | B2 * | 3/2015 | Henglein ............ C09B 67/0098 523/200 |
| 9,000,068 | B2 * | 4/2015 | Trummer .............. C09C 1/0021 523/200 |
| 2002/0134282 | A1 | 9/2002 | Levine et al. |
| 2002/0168484 | A1 | 11/2002 | Kaupp et al. |
| 2002/0169244 | A1 | 11/2002 | Ostertag et al. |
| 2004/0142171 | A1 | 7/2004 | Bottcher |
| 2004/0166316 | A1 | 8/2004 | Noguchi |
| 2004/0194663 | A1 | 10/2004 | Li et al. |
| 2004/0226480 | A1 | 11/2004 | Greiwe et al. |
| 2007/0199478 | A1 | 8/2007 | Schlegl et al. |
| 2009/0252772 | A1 | 10/2009 | Henglein et al. |
| 2009/0264575 | A1 | 10/2009 | Henglein et al. |

(Continued)

FOREIGN PATENT DOCUMENTS

DE 40 30 727 4/1992
DE 43 21 005 1/1995

(Continued)

OTHER PUBLICATIONS

International Search Report and Written Opinion in German dated Feb. 2007 issued in corresponding PCT Application No. PCT/EP2006/007737.
KEN-REACT Reference Manual Titanate, Zirconate and Aluminate Coupling Agents, 2. Uberarbeitete Ausgabe, Sommer 1993, S. 2-21.
Hans-Georg Elias, "Makromoleküle" $4^{th}$ Edition, Hüthig & Wepf Verlag Basel (1981).
Greiwe et al., "Paints and Printing Inks," *Coating*, vol. 11 (1997).
Kiehl, A., et al., "Encapsulated Aluminum Pigments," *Progress in Organic Coatings*, vol. 37, pp. 179-183 (1999).
Japanese Office Action dated Jul. 2, 2013 in corresponding Japanese Patent Application No. 2008-524447 (with English language translation).
Notice of Reasons for Rejection dated Mar. 27, 2012 in corresponding Japanese Patent Application No. 2008-524447 (with English translation).
First Examination Report dated Feb. 24, 2014 issued in corresponding Indian Patent Application No. 820/DELNP/2008.
Machine Translation of WO 2004/092284.
Dr. Ralf Glausch, et al., "Special Effect Pigments," European Coatings Literature, 1998, pp. 32-43.

Primary Examiner — Hannah Pak
(74) Attorney, Agent, or Firm — Ostrolenk Faber LLP

(57) ABSTRACT

The invention relates to metallic effect pigments with coating, comprising a platelet-shaped substrate, where the coating comprises at least one hybrid inorganic/organic layer, the hybrid layer having at least partly an inorganic network that has one or more inorganic oxide components, and having at least one organic component, the organic component being at least partly an organic oligomer and/or polymer which is covalently bonded at least partly to the inorganic network via one or more organic network formers. The invention further relates to a method of producing these metallic effect pigments, and to their use.

24 Claims, No Drawings

(56) References Cited

U.S. PATENT DOCUMENTS

2010/0298469 A1 11/2010 Kaupp et al.
2015/0183995 A1* 7/2015 Henglein ............ C09B 67/0098
　　　　　　　　　　　　　　　　　　　　　　424/401

FOREIGN PATENT DOCUMENTS

| | | |
|---|---|---|
| DE | 195 20 312 | 12/1996 |
| DE | 196 35 085 | 3/1998 |
| DE | 196 39 783 | 4/1998 |
| DE | 198 20 112 | 11/1999 |
| DE | 198 38 241 | 2/2000 |
| DE | 101 14 445 | 9/2002 |
| DE | 101 14 446 | 9/2002 |
| DE | 103 15 755 | 10/2004 |
| EP | 0 259 592 | 3/1988 |
| EP | 0 416 395 | 3/1991 |
| EP | 0 477 433 | 4/1992 |
| EP | 1 322 714 | 7/2003 |
| JP | A-H03-100068 | 4/1991 |
| JP | A-H11-507412 | 6/1999 |
| JP | 2000-080303 | 3/2000 |
| JP | A-2002-513838 | 5/2002 |
| JP | 2004-131542 | 4/2004 |
| WO | WO 01/81483 | 11/2001 |
| WO | WO 03/014228 | 2/2003 |
| WO | WO 2004/092284 A1 | 10/2004 |
| WO | WO 2005/063897 A2 | 7/2005 |
| WO | WO 2005/063897 A3 | 7/2005 |

* cited by examiner

METAL EFFECT PIGMENTS COMPRISING A MIXED INORGANIC/ORGANIC LAYER, METHOD FOR THE PRODUCTION OF SUCH METAL EFFECT PIGMENTS, AND USE THEREOF

CROSS-REFERENCE TO RELATED APPLICATIONS

The present application is a divisional of prior U.S. patent application Ser. No. 12/063,019, filed May 23, 2008, by Stefan Trummer, Frank Henglein and Mariel Brauer entitled "METAL EFFECT PIGMENTS COMPRISING A MIXED INORGANIC/ORGANIC LAYER, METHOD FOR THE PRODUCTION OF SUCH METAL EFFECT PIGMENTS, AND USE THEREOF," which is a 35 U.S.C. § 371 National Phase conversion of International Application No. PCT/EP2006/007737, filed Aug. 4, 2006, which claims priority of German Patent Application No. 10 2005 037 611.8, filed Aug. 5, 2005. The PCT International Application was published in the German language. The contents of each of the patent applications above-listed are incorporated in full herein by reference.

BACKGROUND OF THE INVENTION

The invention relates to platelet-shaped metallic effect pigments with a hybrid inorganic/organic layer, and to a method of producing them. The invention further relates to the use of these metallic effect pigments. The optical effect of metallic effect pigments is based on their platelet-shaped (or lamellar) structure, which leads to an orientation substantially parallel to the substrate in an application medium. The platelet-shaped structure of the oriented metallic effect pigments in turn produces effect-imparting properties such as, for example, a light/dark flop and also a high gloss.

The specific optical effect is very importantly determined by the pigment size and pigment size distribution and also by the average thickness of the metallic effect pigments. In terms of their platelet-shaped structure, metallic effect pigments are sensitive to the influence of mechanical forces, and particularly of shearing forces. By excessive shearing operations they may become disintegrated or deformed, thereby impairing the effect-imparting properties. The sensitivity of the metallic effect pigments is manifested, for example, in the fact that the metallic effect pigments are easily damaged or disintegrated on pumping through the circuit line systems of automobile finishing equipment. Additionally, in contrast to conventional color pigments, metallic effect pigments must be incorporated gently into wet coating materials, in order to avoid damage to the metallic effect pigments. Furthermore, metallic effect pigments cannot be incorporated, like chromatic pigments, by extrusion and subsequent grinding in a pinned disk mill, into the base varnish of a powder coating material. In that case they would generally be comminuted to such an extent that the characteristic optical effects would be lost almost completely.

A further critical point relates to the corrosion resistance of metallic effect pigments. Mention may be made here, for example, of the gassing stability of aluminum pigments in alkaline aqueous varnishes. In these media, unprotected aluminum pigments undergo corrosion, giving off hydrogen, a phenomenon also referred to as "gassing". This unwanted event is associated with a potential for explosion, and, furthermore, oxidation robs the aluminum pigments of their typical optical properties. Furthermore, the hydrogen produced adversely affects the rheological properties of the coating material.

For a relatively long time, therefore, metallic effect pigments have been provided with purely inorganic or with purely organic three-dimensionally crosslinked coatings. These coatings generally serve as a protection against corrosion with respect to aggressive media, but often also have a mechanically stabilizing action. Moreover, metal pigments which are used in the powder coating material may be given a suitable electrostatic chargeability by means of dielectric coatings.

Metal pigments can be coated, for example, with silicon dioxide (U.S. Pat. No. 2,885,366 and U.S. Pat. No. 3,954,496) or with acrylate polymers (DE 40 30 727). $SiO_2$-coated metal pigments are available commercially and are sold by Eckart GmbH & Co. KG under the names PCR, Hydrolan®, and also Resist and Dorolan®. Silicon dioxide coats endow aluminum pigments, for example, with excellent gassing stability in aqueous varnish systems. Moreover, the hardness of such a coating stabilizes the ductile and shear-sensitive aluminum flakes against the influence of shearing forces of the kind which occur, for example, in the circuit line systems in automobile finishing equipment (A. Kiehl and K. Greiwe, *Progress in Organic Coatings* 37 (1999) 179).

A similar effect also occurs in the case of aluminum oxide coatings (DE 195 20 312, H. Birner and K. Greiwe, *Coating* 11 (1997) 432). Also known are chromated aluminum pigments (EP 0 259 592), where an impervious mixed layer of aluminum oxide and chromium oxide provides for gassing stability.

The advantageous properties achieved through purely inorganic or purely organic three-dimensionally crosslinked coatings on metallic effect pigments must be distinguished from different surface coverings on the pigments. The aim of such surface coverings is always to improve the performance properties, which are influenced by the surface chemistry of the metallic effect pigments. Thus, for example, the wetting of the metal pigments is influenced directly by the surrounding varnish medium. Thus DE 198 20 112 A1 describes reactive organic orientation assistants which are able to attach chemically to a functional group on the surface of a metallic effect pigment and to attach to another functional group on the varnish. The organic orientation assistants are applied as a separate coat to metallic effect pigments which have been given inorganic oxide coats or organic polymer coats. The orientation assistants alter the surface properties of the metallic effect pigment and allow covalent attachment to the binder of the varnish, thereby improving on the one hand the orientation of the pigments in the varnish and on the other hand the condensation resistance of the cured varnish.

DE 196 35 085 A1 discloses aluminum pigments coated with a passivating protective coat and produced by Physical Vapor Deposition (PVD). A protective layer of inorganic oxides and organic oligomers and/or polymers bonded covalently to one another is not described.

DE 40 30 727 A1 contains resin-coated metal pigments which on their surface first have a covalently bonded siloxane layer to which a three-dimensionally crosslinked synthetic resin coating is bonded covalently. A disadvantage of these pigments is that they are not very stable toward corrosion. Additionally, this siloxane layer does not produce effective mechanical attachment of the synthetic resin coating to the metal pigments.

EP 1 322 714 A2 discloses a pigment preparation containing metal pigments coated with a silicon-oxygen matrix.

This refers to pure $SiO_2$ coatings and also to coatings with an $SiO_2$ matrix into which organofunctional silanes have been incorporated.

WO 03/014228 A1 discloses metal pigments which have been coated with a first coat of phosphates or borates and with a second coat of $SiO_2$. According to the teaching of that specification the $SiO_2$ layer may also comprise organofunctional silanes.

A disadvantage of metallic effect pigments with a purely inorganic coating, or of inorganic coats into which organosilanes have been incorporated, is that these coats are very brittle. It has emerged that, under severe mechanical stress, these coats may be damaged, leading to a loss of desired properties.

Thus, for example, the processing of silicate-coated metallic effect pigments in a mixer can lead to a loss of gassing stability on the part of the pigments. In such an operation the pigments as a powder are pasted with solvent in the mixer, for example. These pastes possess extremely high viscosities. As a result, the mechanical shearing energy of the mixer blades imposes strong shearing forces on the metallic effect pigments. The brittle $SiO_2$ coats may be mechanically broken by the shearing forces which act. Thus, in certain circumstances, injury to the coating of only a tiny fraction of the platelets is enough to lead to a reaction with surrounding water molecules, which first entails an explosion risk and second leads to a deterioration in the optical properties as a result of corrosion, such a deterioration being unwanted. For the production of metallic effect pigments in consistent quality, however, processing in a mixer is an unavoidable production step.

Quality detractions of this kind are the case even when the substrate used is an iron oxide-coated aluminum pigment ("Paliocrom"). These pigments can be made very stable to gassing, by means of a further $SiO_2$ coating. In this case there are two successive inorganic coats, but they are both brittle.

The problem of brittleness cannot be solved simply by increasing the thickness of the $SiO_2$ coat, or by similar measures, without having to accept significant deteriorations in other performance properties. Increasing the coat thickness impairs the pigment's opacity and leads to an increasing deterioration in the optical properties of the metal pigment. Nor does an additional organic functionalization of the surface produce any change in the fundamental brittleness of the $SiO_2$ coat.

A disadvantage of the purely organic coating of metallic effect pigments is that they are not sufficiently stable to gassing.

SUMMARY OF THE INVENTION

It is an object of the present invention to provide metallic effect pigments having improved mechanical properties. The metallic effect pigments, even after exposure to strong shearing forces, are to exhibit good optical properties in the application medium and are also to possess a good gassing stability.

The object on which the invention is based is achieved by provision of metallic effect pigments with coating, comprising a platelet-shaped substrate, where the coating comprises at least one hybrid inorganic/organic layer, the hybrid layer having at least partly an inorganic network that has one or more inorganic oxide components, and having at least one organic component, the organic component being at least partly an organic oligomer and/or polymer which is covalently bonded at least partly to the inorganic network via one or more organic network formers.

Preferred developments are specified in dependent claims 2-21.

The object is further achieved by provision of a method of producing metallic effect pigments with hybrid inorganic/organic layer, which comprises the following steps:
reacting at least one inorganic network former and at least one organic network former and at least one reactive organic component in a liquid phase to form a coating composition,
applying the coating composition to platelet-shaped metallic substrates as a hybrid layer, the platelet-shaped metallic substrates being added to the liquid phase before, during or after the addition or reaction of the at least one inorganic network former and of the at least one organic network former and of the at least one reactive organic component, the hybrid layer having at least partly an inorganic network that has one or more inorganic oxide components, and having at least one organic component, the organic component at least partly being an organic oligomer and/or polymer which is covalently bonded at least partly to the inorganic network.

The at least one inorganic network former, the at least one organic network former, and the at least one reactive organic component can be combined with one another in any order. The reaction conditions, however, must be set such that a reaction can take place between the components. Preferably the reaction is accomplished by hydrolysis and/or condensation of the components with one another. The components are therefore hydrolyzable and/or condensable. The coating composition which forms in the course of the hydrolysis and/or condensation is then applied to the metal pigment surface, preferably by precipitation.

The metal pigments can be added to the liquid phase before, during or after the addition or reaction of the at least one inorganic network former and of the at least one organic network former and of the at least one reactive organic component. Accordingly the metal pigments can be first introduced in a liquid phase and then the inorganic network former(s), the organic network former(s), and the reactive organic component(s) added in any order. Alternatively the metal pigments can be added to the coating composition during the reaction or after the reaction. Depending on the order of the addition and on the reaction conditions applied, a predominantly inorganic or predominantly organic layer may be applied first to the metal pigment surface, before the hybrid inorganic/organic layer is applied. The inorganic/organic layer may of course also be applied directly to the uncoated or precoated metallopigment surface.

DESCRIPTION OF PREFERRED EMBODIMENTS

According to one preferred development the method of the invention comprises the following steps:
(a) providing a reaction mixture of platelet-shaped metallic substrates in a liquid phase,
(b1) adding at least one inorganic network former to the reaction mixture from step (a),
(c1) hydrolyzing and/or condensing the inorganic network former added in step (b1),
(d1) adding at least one reactive organic network former and at least one reactive organic component before, during and/or after the hydrolysis and/or condensation of step (c1), or (b2) adding at least one reactive organic network former and at least one reactive organic component to the reaction mixture from step (a),
(c2) adding at least one hydrolyzable or condensable inorganic network former to the reaction mixture from step (b2),
(d2) hydrolyzing and/or condensing the inorganic network former added in step (c2), and
(e) reacting hydrolyzed and/or condensed inorganic network former with the reactive organic network former and also with the reactive organic component, with simultaneous and/or subsequent deposition of a hybrid inorganic/organic layer,
(f) optionally separating the platelet-shaped substrates coated in step (e) from the reaction mixture.

By inorganic network former in the sense of the invention is meant that the inorganic network former is able to construct an inorganic network. An inorganic network former may be, for example, a hydrolyzable metal salt or else a fully hydrolyzable organometallic compound.

By an organic network former in the sense of the invention is meant that the organic network former is able, in conjunction with a reactive organic component, to construct an organic or organometallic network. An organic network former is preferably an organometallic compound which is only partly hydrolyzable and so is unable to construct an inorganic network.

The object on which the invention is based is also achieved through the use of the platelet-shaped metallic effect pigment of any one of claims 1 to 21 in varnishes, automobile finishes, paints, printing inks, powder coating materials, architectural paints, plastics, security printing inks, ceramics, glass or cosmetic preparations.

The object on which the invention is based is further achieved through the use of the platelet-shaped metallic effect pigment of any one of claims 1 to 21 as IR (infrared light)-reflecting pigments in masonry paints and/or architectural paints.

It has become apparent, surprisingly, that mechanically stable metallic effect pigments that are also stable to gassing can be obtained if the metallic effect pigments are enveloped with a hybrid layer of organic oligomers and/or polymers and also with an inorganic network of inorganic oxides. The organic oligomers and/or polymers are at least partly covalently bonded to the inorganic network. The inorganic network is preferably interpenetrated by the at least partly covalently bonded organic oligomers and/or polymers. In the sense of the invention, then, layers of inorganic oxides and organic oligomers and/or polymers are formed that are not separated from one another. Preferably a layer is formed in which the inorganic network and the organic oligomers and/or polymers are in mutual interpenetration.

Surprisingly the hybrid layers of the metallic effect pigments of the invention have a mechanical hardness which is comparable with those of pure inorganic oxide layers. In contradistinction to pure inorganic oxide layers, the hybrid inorganic/organic layers of the metallic effect pigments of the invention are substantially more elastic, i.e., substantially less brittle. The metallic effect pigments of the invention are therefore substantially easier to handle, being substantially less sensitive to mechanical exposure, such as shearing forces, for example. The improved mechanical stability is surprisingly achieved without any impairment in the gassing stability.

It has become apparent, for example, that, following application of a hybrid layer of SiO$_2$ and organic oligomer and/or polymer to metallic effect pigments, pigments are obtained which are stable to gassing and which remain stable to gassing even after processing in a mixer. The organic oligomers and/or polymers in this case are at least partly covalently linked to the SiO$_2$ layer. The organic component raises the elasticity of the coating without substantially adversely affecting the mechanical hardness. The result is an abrasion stability on the part of the coating that is improved significantly in comparison to purely inorganic layers.

Furthermore it has emerged, surprisingly, that the improvement in mechanical stability through a hybrid inorganic/organic layer is obtained even when one (or more) further, purely inorganic oxide layers are deposited on this hybrid layer.

A further surprise is that, in the case of a hybrid inorganic/organic layer, it is possible in fact to achieve improved protection of metallic effect pigments against corrosion, as compared with pure organic or inorganic layers.

Accordingly, through the incorporation of organic oligomers and/or polymers into inorganic oxide layers, performance properties of metallic effect pigments are improvable in a wide diversity of ways.

In accordance with the invention the at least partial covalent bonding of the inorganic oxide network to the organic oligomer and/or polymer takes place via at least one organic network former. Organic network formers are reagents able to attach both to the inorganic network and to the organic oligomer and/or polymer.

According to one preferred embodiment the at least partial covalent bonding of inorganic oxide component and organic oligomer and/or polymer is accomplished at least partly through one or more organic network formers, the organic network former preferably having the general formula (I)

$$R^1{}_n R^2{}_m R^3{}_o SiX_{(4-n-m-o)} \qquad (I)$$

where X is a hydrolyzable group after whose hydrolysis a covalent bond of organic network former to the inorganic network can be formed
and R$^1$ is a reactive organic group which is covalently bondable to the organic oligomer and/or polymer,
R$^2$ and R$^3$ independently of one another are each an organic group which may be covalently bondable to the organic oligomer and/or polymer,
with the proviso that
n, m and o are integers, with n+m+o=1-3 and n=1 to 3, m=0 to 2, and o=0 to 2,
and/or the general formula (II)

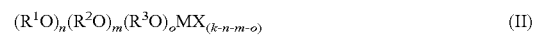
$$(R^1O)_n(R^2O)_m(R^3O)_o MX_{(k-n-m-o)} \qquad (II)$$

where the organometallic compound has at least one hydrolyzable group X after whose hydrolysis a covalent bond of organic network former to the inorganic network can be formed, at least one organic radical R$^1$ which is a reactive organic group which is covalently bondable to the organic oligomer and/or polymer, and R$^2$ and R$^3$ independently of one another may each be an organic group which may be covalently bondable to the organic oligomer and/or polymer, where
k is the formal oxidation number of M,
M is Al, Zr or Ti,
n is an integer from 1 to (k−1),
m is an integer from 0 to (k−2),
o is an integer from 0 to (k−2), and
where n+m+o is an integer from 1 to k−1.

By formal oxidation number is meant, in accordance with the invention, that aluminum can have the oxidation number III, zirconium the oxidation number II, III or IV, and titanium the oxidation number II, III or IV. Preferably both zirconium and titanium have the oxidation number IV.

According to one preferred development of the invention the reactive group $R^1$ or the reactive organic radical $R^1$ is polymerizable. The radical $R^1$ may be polymerizable, for example, with further radicals $R^1$, so that the organic network former can be present as such in an oligomerized or polymerized form in the hybrid inorganic/organic layer. Alternatively the radical $R^1$ may be polymerizable with other monomers, so that the organic network former may be present in the hybrid inorganic/organic layer in copolymerized form, in a polymer also constructed from further monomers.

Particularly preferred as organic network formers are organofunctional silanes. They are able, after the hydrolysis of the hydrolyzable group X, to attach to the inorganic network. As a result of the hydrolysis, the group X is generally replaced by an OH group, which then condenses with OH groups of the inorganic network to form a covalent bond. The group X here stands preferably for halogen, hydroxyl, alkoxy having 1-10 C atoms, which may be straight-chain or branched, may have in the carbon chain, and mixtures thereof.

The organic network former attaches at least via the functional group $R^1$ with or to the organic oligomer and/or polymer. $R^1$ is preferably a reactive functional group.

The reactive, preferably polymerizable, organic radical $R^1$ preferably has one or more substituents selected from the group consisting of amino, hydroxyl, thiol, epoxy, acrylate, methacrylate, vinyl, allyl, alkenyl, alkynyl, carboxyl, carboxylic anhydride, isocyanate, cyanate, ureido, and carbamate group, and mixtures thereof. The organic radical $R^1$ is preferably connected to the central silicon atom via a covalent C—Si bond.

The radicals $R^2$ and $R^3$ independently of one another are selected from the group consisting of H—, $(C_1-C_{40})$-alkyl-, $(C_1-C_{40})$-fluorinated alkyl-, $(C_1-C_{40})$-partially fluorinated alkyl-; $(C_2-C_{40})$-alkenyl-, $(C_2-C_{40})$-alkynyl-; $(C_6-C_{36})$-aryl-, fluorinated $(C_6-C_{36})$-aryl-, partially fluorinated $(C_6-C_{36})$-aryl-; $(C_7-C_{40})$-alkylaryl-, $(C_7-C_{40})$-arylalkyl-, fluorinated $(C_7-C_{40})$-alkylaryl-, partially fluorinated $(C_7-C_{40})$-alkylaryl-; $(C_8-C_{40})$-alkenylaryl-, $(C_8-C_{40})$-arylalkynyl-, -; $(C_8-C_{40})$-alkynylaryl-; $(C_5-C_{40})$-cycloalkyl-, $(C_6-C_{40})$-alkylcycloalkyl-, $(C_6-C_{40})$-cycloalkylalkylsilanes each of which may be substituted by amino, hydroxyl, thiol, epoxy, acrylate, methacrylate, vinyl, allyl, alkenyl, alkynyl, carboxyl, carboxylic anhydride, isocyanate, cyanate, ureido, carbamate and/or ester group and may contain O, N, and S as heteroatoms in the carbon chains and carbon ring systems. The radicals $R^2$ and $R^3$ preferably have chain lengths with 3 to 20 carbon atoms, more preferably with 5 to 18 carbon atoms. The radicals $R^2$ and $R^3$ may be branched and/or linear. In the case of alkyl chains, these chains may be interrupted by heteroatoms such as O, S or N.

The organic group or the radical $R^1$ in any case has a reactivity which allows covalent bonding of the organic oligomer and/or polymer.

The organic groups or radicals $R^2$ and/or $R^3$ may also have a reactivity which allows covalent bonding of the organic oligomer and/or polymer. In contrast to the organic group $R^1$ or the radical $R^1$, however, it is not necessary for a covalent bond to the organic oligomer and/or polymer to form between the radicals $R^2$ and/or $R^3$. Accordingly the radicals $R^2$ and/or $R^3$ may also be nonreactive. More particularly the radicals $R^2$ and $R^3$ are preferably nonpolymerizable under the applied reaction conditions. Thus it is preferred for the radicals $R^2$ and $R^3$, in contrast to the radical $R^1$, to be unable to polymerize with one another and, more particularly under the applied reaction conditions, to be unable to react with monomers to form a polymer.

Suitable organofunctional silanes are, for example, numerous representatives of the products produced by Degussa (Untere Kanalstrasse 3, D-79618 Rheinfelden) and sold under the trade name "Dynasylan". For example, 3-methacryloyloxypropyltrimethoxysilane (Dynasylan MEMO) can be used to construct a (meth)acrylate or polyester, vinyltri(m)ethoxysilane (Dynasylan VTMO or VTEO) to construct a vinyl polymer, 3-mercaptopropyltri(m)ethoxysilane (Dynasylan MTMO or 3201) for polymerizational incorporation into rubber polymers, aminopropyltrimethoxysilane (Dynasylan AMMO) or N2-aminoethyl-3-aminopropyltrimethoxysilane (Dynasylan DAMO) to construct a β-hydroxyamine, or 3-glycidyloxy-propyltrimethoxysilane (Dynasylan GLYMO) to construct a urethane or polyether network.

Further examples of silanes with vinyl and/or (meth) acrylate functionalities are as follows: isocyanatotriethoxysilane, 3-isocyanatopropoxytri-ethoxysilane, vinylethyldichlorosilane, vinylmethyl-dichlorosilane, vinylmethyldiacetoxysilane, vinyl-methyldiethoxysilane, vinyltriacetoxysilane, vinyltri-chlorosilane, phenylvinyldiethoxysilane, phenylallyl-diethoxysilane, phenylallyldichlorosilane, 3-methacryl-oyloxypropyltriethoxysilane, methacryloyloxypropyltrimethoxysilane, 3-acryloyloxypropyltrimethoxysilane, 2-methacryloyloxy-ethyltri(m)ethoxysilane, 2-acryloyl-oxyethyltri(m)ethoxysilane, 3-methacryloyloxypropyltris(methoxyethoxy)silane, 3-methacryloyloxypropyltris(butoxyethoxy)silane, 3-methacryloyloxypropyltris(propoxy)silane, 3-methacryloyloxypropyltris(butoxy)silane.

As organic network formers it is also possible to use suitable organofunctional titanates, zirconates or aluminates, of the kind produced, for example, by Kenrich Petrochemicals and offered under the trade name Ken-React® (purchasable from Nordmann, Rassmann GmbH, Kajen 2, 20459 Hamburg). More particularly the coupling reagents given in the KEN-REACT® Reference Manual Titanate, Zirconate and Aluminate Coupling Agents, $2^{nd}$ revised edition, Summer 1993, on pages 2 to 21 can be used for the most part as organic network formers. The disclosure content of pages 2 to 21 of the aforementioned KEN-REACT® reference manual is hereby incorporated by reference.

The hydrolyzable or condensable group X of these organic network formers is preferably alkoxy, but alternatively hydroxyl or halogen. In the case of alkoxy it is also possible for there to be a cyclic group attached via two oxygen atoms to the central atom M, such as oxoethylene or cycloneopentyl, for example. In this case the central atom M has only two further substituents. The hydrolyzable group may also be part of a cyclic unit attached coordinatively via further oxygen atoms to the central atom, and hence may not be eliminated from the molecule after hydrolysis.

In the case of further forms there may be two organophosphito ligands bonded coordinatively to the central atom. In this case there are four alkoxy ligands attached to the central atom.

These Al—, Zr— or Ti-organic network formers may be present in the form of chelate complexes or coordination complexes. The ligands in that case may contain heteroatoms, preferably N, S or O.

Examples of such organic network formers are (see KEN-REACT® Reference Manual—Titanate, Zirconate and Aluminate Coupling Agents by Salvatore J. Monte): Isopropyldimethacryloylisostearoyltitanate(IV)(KR7), alkoxytrimethacryloyltitanate(KR 33DS), isopropyltri (N-ethylenediamino)ethyltitanate(IV)(KR 44), tris (2-propenoato-0)methoxyglycolytotitanate (KR 39DS), methacrylatotriisopropoxytitanate, methacryloyloxy ethylacetoacetonatotriisopropoxytitanate, (2-methacryloyloxyethoxy) triisopropoxytitanate titanium(IV) 2,2 (bis2propenolatomethyl)butanolato tris(dioctyl) pyrophosphato-0 (LICA 38J), methacryloyloxyethylacetoacetonatotri-n-propoxyzirconate, neopentyl (diallyl)oxy-tri(N-ethylenediamino)ethyl-zirconate(IV)(NZ 44), 9-octadecenylacetoacetato-diisopropoxyaluminate.

The inorganic component of the hybrid layer is preferably composed of metal oxide and/or metal oxide hydrate and/or metal suboxide and/or metal hydroxide, at least partially forming a two- or three-dimensional network with one another.

The inorganic fraction of the hybrid layer of metal oxide and/or metal oxide hydrate and/or metal suboxide and/or metal hydroxide and/or metal peroxide is preferably selected from the group consisting of silicon, aluminum, titanium, zirconium, cerium, chromium, manganese, antimony, zinc, boron, magnesium, iron, and their mixtures and alloys.

As starting compounds which act as inorganic network formers of these oxides it is preferred to use alkoxides, hydroxides, and halides of these metals.

The inorganic network formers preferably possess the general formula $$MX_n$$

where X independently at each occurrence is an optionally hydrolyzable and/or condensable group from halogen, hydroxyl or alkoxy having 1-10 C atoms, it being possible for the alkoxy group in the carbon chain to have heteroatoms, preferably O, S and/or N, in the carbon chain.

The metal M is preferably Si, Al, Ti, Zr, P, Fe, Mg, Mn, Sb, Cr, Zn and/or Ce, with the proviso that,
if M is Sb(V),
n is 5 and,
if M is Si, Ti or Zr,
n is 4 and,
if M is Al, Ce, Fe(III), SB(III) or B,
n is 3 and,
if M is Zn, Fe(II) or Mg,
n is 2.
Where M is Al, Ti, Zr or Fe it is also possible for X to stand for chelating ligands such as acetylacetonates or acetoacetic esters, for example.

It is preferred to use inorganic network formers in which M is Si, Al, Ti and/or Zr, and X is alkoxy groups having 1 to 6 C atoms, it being possible for the alkoxy group in the carbon chain to have heteroatoms, preferably O, S and/or N, in the carbon chain. It is particularly preferred to use tetraalkoxysilanes, more particularly tetramethoxy- and/or tetraethoxysilanes, to construct an $SiO_2$ layer.

Metallic effect pigments, more particularly aluminum effect pigments, which have been provided with a hybrid layer of $SiO_2$ and acrylate and/or methacrylate are mechanically very stable and very stable to gassing. It has emerged that these properties can be improved further if, when generating the inorganic network, as for example by hydrolysis of tetraethoxysilane, acrylosilane and acrylic monomer and/or methacrylic monomer are added. With this approach there is on the one hand a coupling of acrylosilane to the $SiO_2$ network which forms, and on the other hand a polymerization of acrylic monomer and/or methacrylic monomer, and also a polymerizational incorporation of the acrylic group of the acrylosilane into the acrylic oligomer and/or polymer and/or methacrylic oligomer and/or polymer constructed from acrylic monomers and/or methacrylic monomers.

The precipitation of purely inorganic coatings on metallic effect pigments from metallic starting compounds of this kind is typically accomplished at specific pH levels. These and other typical reaction conditions, such as temperature or time, are known to the skilled worker.

If the precipitation of the metal oxide from suitable inorganic network former on the platelet-shaped substrate is carried out in the presence of suitable monomers and, optionally, polymerization initiators and also organic network formers, then it is possible at the same time in a targeted way to form an inorganic oxide network and an organic oligomer and/or polymer. The inorganic network and the organic oligomers and/or polymers are preferably in mutual interpenetration. In the case of one preferred development of the invention there is not only an inorganic network but also an organic network of oligomers and/or polymers, which are preferably in mutual interpenetration.

Depending on the reaction conditions, the proportions of the reactants used, and the kinetics of the reactions that take place, the hybrid inorganic/organic layer may be substantially homogeneous. It is also possible, however, for there to be small regions of inorganic network and/or organic oligomer and/or polymer in the hybrid layer.

By organic oligomers in the hybrid layer are meant, in this invention, the concept which is customary in polymer chemistry: that is, the linking of two to twenty monomer units (Hans-Georg Elias, "Makromoleküle", $4^{th}$ Edition 1981, Huthig & Wepf Verlag, Basle). Polymers are linkages of more than twenty monomer units.

In view of the diversity of organic monomers and the use of different metal oxides or metal oxide mixtures, there is in principle a wide range of variation possibilities for the formation of a hybrid inorganic/organic layer. Through the ratio of monomer concentration to the concentration of the organic network formers it is possible to vary the average chain length of the organic segments. Thus it is possible to produce coatings which endow the metallic effect pigments with tailored properties in a multiplicity of respects. The average chain length of the organic segments is 2 to 10 000, preferably 10 to 1000, and more preferably 40 to 200 monomer units.

The organic oligomer and/or polymer in the hybrid layer may be constructed by polymerization of suitable monomers. The monomers may have functionalities selected from the group consisting of amino, hydroxyl, thiol, epoxy, acrylate, methacrylate, vinyl, allyl, alkenyl, alkynyl, carboxyl, carboxylic anhydride, isocyanate, cyanate, ureido, carbamate, and ester group, and mixtures thereof.

In one preferred embodiment the hybrid inorganic/organic layer is implemented using organic network formers for the covalent linking of organic and inorganic networks and through polymerization of organic monomers. Particular preference is given to using silanes containing (meth)acrylate functions, such as Dynasylan MEMO, for example, as organic network formers, and methacrylates as monomers.

Suitable as monomers or reactive oligomers or polymers are, more particularly, crosslinking (meth)acrylates, i.e., polyfunctional (meth)acrylates. Examples of such compounds are:
tetraethylene glycol diacrylate (TTEGDA), triethylene glycol diacrylate (TIEGDA), polyethylene glycol-400 diacrylate (PEG400DA), 2,2'-bis(4-acryloyloxyethoxy-phenyl) propane, ethylene glycol dimethacrylate (EGDMA), diethylene glycol dimethacrylate (DEGDMA), triethylene glycol dimethacrylate (TRGDMA), tetraethylene glycol dimethacrylate (TEGDMA), butyl diglycol methacrylate (BDGMA), trimethylolpropane trimethacrylate (TMPTMA), 1,3-butanediol dimethacrylate (1,3-BDDMA), 1,4-butanediol dimethacrylate (1,4-BDDMA), 1,6-hexanediol dimethacrylate (1,6-HDMA), 1,6-hexanediol diacrylate (1,6-HDDA), 1,12-dodecanediol dimethacrylate (1,12-DDDMA), neopentyl glycol dimethacrylate (NPGDMA), particular preference is given to trimethylolpropane trimethacrylate (TMPTMA).

These compounds are available commercially from Elf Atochem Deutschland GmbH, D-40474 Düsseldorf, Germany, or Rohm & Haas, In der Kron 4, 60489 Frankfurt/Main, Germany.

Noncrosslinking (meth)acrylates can also be used as monomers for constructing the organic component, i.e., the organic oligomer and/or polymer, of the hybrid layer. Depending on further functional groups of these (meth)acrylates it is possible in turn to enable a very wide diversity of variation possibilities for the chemical composition and hence also for the performance properties of the metallic effect pigments provided with a hybrid layer. Also suitable are mixtures of crosslinking and monofunctional vinyl and/or (meth)acrylate monomers.

Examples of monofunctional (meth)acrylates are: lauryl (meth)acrylate, allyl (meth)acrylate, propyl (meth)acrylate, isobornyl methacrylate, and hydroxyl-ethylimidazoline methacrylate.

These compounds are likewise available commercially from Elf Atochem Deutschland GmbH, Uerdingerstr. 4 D-40474 Dusseldorf or from Rohm & Haas, In der Kron 4, 60489 Frankfurt/Main, Germany.

The polymerization of vinyl-functional and/or (meth)acrylate-functional monomers when constructing the hybrid inorganic/organic layer can be accomplished by thermal polymerization. Preference is given to the use of polymerization initiators, preferably free-radical initiators. These are commercially customary, generally organic or inorganic peroxides or diazonium compounds. Examples of such compounds are:
Acetylcyclohexanesulfonyl peroxide, bis(2,4-dichloro-benzoyl) peroxide, diisononanyl peroxide, dioctanoyl peroxide, diacetyl and dibenzoyl peroxide; peroxy-dicarbonates (e.g., diisopropyl peroxydicarbonate, di-n-butyl peroxydicarbonate, di-2-ethylhexyl peroxydicarbonate, dicyclohexyl peroxydicarbonate), alkyl peresters (e.g., cumyl perneodecanoate, t-butyl perneodecanoate, t-amyl perpivalate, t-butyl per-2-ethyl-hexanoate, t-butyl perisobutyrate, t-butyl perbenzoate), dialkyl peroxides (e.g., dicumyl peroxide, t-butyl cumyl peroxide, 2,5-dimethylhexane-2,5-di-t-butyl peroxide, di(t-butylperoxyisopropyl)benzene, di-t-butyl peroxide, or 2,5-dimethylhex-3-yne-2,5-di-t-butyl peroxide), perketals (e.g., 1,1'-bis(t-butylperoxy)-3,3,5-trimethylcyclohexanone peroxide, methyl isobutyl ketone peroxide, methyl ethyl ketone peroxide, acetylacetone peroxide), alkyl hydroperoxides (e.g., pinane hydroperoxide, cumene hydroperoxide, 2,5-dimethylhexane-2,5-dihydroperoxide or t-butyl hydroperoxide), azo compounds (e.g., 4,4'-azobis(4-cyanovaleric acid), 1,1'-azobis(cyclohexanecarbonitrile), 1,1'-azobis(isobutyroamidine) dihydrochloride, 2,2'-azobis (isobutyronitrile), or persulfates such as sodium peroxodisulfate and potassium peroxodisulfate. Preference is given to 2,2'-azobis(isobutyronitrile).

These compounds are available commercially from Aldrich Chemie, D-89552, Steinheim.

The polymerization of vinyl-functional and/or (meth)acrylate-functional monomers when constructing the hybrid inorganic/organic layer may also be carried out, furthermore, by an ATRP (atomic transfer radical polymerization), the so-called living free-radical polymerization. Here the organic network former used is preferably a silane compound in which $R^1$ has been provided terminally with an alkyl halide, preferably an alkyl bromide with an ester group in α position. Also added in this case are Cu(I) salts, optionally in a mixture with Cu(II) salts or metallic Cu, and also suitable ligands which complex the copper compounds. Further details on this are found in DE 198 38 241 A1.

When epoxysilanes are used as organic network formers, they can be reacted with polyfunctional amines as crosslinkers. Further variation possibilities are also obtained when using polyfunctional epoxy compounds. Combinations of polyfunctional epoxy compounds and polyfunctional amino compounds may of course also be used when using amino-functional silanes as coupling reagents.

Examples of polyfunctional amines suitable for such reactions and available commercially include the following: 3,3-dimethyl-4,4-diaminodicyclohexylmethane, ethylenediamine, triethylenetetramine, meta-xylylene-diamine, N-aminoethylpiperazine, 2-methyl-1,5-penta-methylenediamine, 1,2-diaminocyclohexane or isophorone-diamine.

Examples of suitable polyfunctional epoxy compounds available commercially include the following: 1,4-butanediol diglycidyl ether, glycerol triglycidyl ether, neopentyl glycol diglycidyl ether, pentaerythritol polyglycidyl ether, 1,6-hexanediol diglycidyl ether, polypropylene glycol diglycidyl ether or trimethylolpropane triglycidyl ether. These polyfunctional amines and epoxy compounds are available commercially from the company UPPC: (U. Prümmer Polymer-Chemie GmbH; Mühlhalde 8 in D-88487 Baltringen).

In a further embodiment of the invention the organic network is not prepared during the reaction. Instead the organic component used comprises reactive organic oligomers and/or polymers which possess reactive groups which permit attachment to the oxide network via the at least one group $R^1$ of the organic network formers. In order to ensure an effective reaction with, more particularly, the group $R^1$ of the organic network formers, the oligomer and/or polymer can also be reacted directly with the organic network former before incorporation into the hybrid layer. For that purpose the oligomers and/or polymers are dissolved in a suitable solvent, organic network formers are added, and the components are reacted. The organic oligomers and/or polymers coupled with the organic network former can then be reacted with the metal oxide-forming compounds used to generate the inorganic network, to form the hybrid inorganic/organic layer.

Examples of reactive organic oligomers and/or polymers which can be incorporated directly into the inorganic network that forms, during the reaction, include the following: silicones terminated with silanol or methoxy groups, silane-modified polyethyleneimines or polybutadienes, polyarylalkylsilasesquioxanes or amino-silane-modified polyethylene oxide urethanes. For these compounds, particularly low molecular weights from a range from 100 to 1000 g/mol are preferred. Low molecular weight compounds of this type have a particularly large number of linkage sites to the inorganic oxide network, and so produce more homogeneously distributed hybrid inorganic/organic layers.

Examples of commercially available compounds of this kind are:
reactive silicones such as 1,7-dichlorooctamethyltetra-siloxane, diphenylsiloxanes terminated with silanol groups, dimethylsiloxane and diphenylsiloxane copolymers terminated with silanol and/or methoxy groups, polytrifluoropropylmethylsiloxane terminated with silanol groups, trimethoxysilylpropyl-substituted polyethyleneimine, dimethoxymethylsilylpropyl-substituted polyethyleneimine, triethoxysilyl-modified polybutadiene, dimethoxymethylsilyl-modified polybutadiene, vinylmethoxysiloxane oligomer, (N-triethoxysilylpropyl)-O-polyethylene oxide urethane and poly(trimethylsilylpropyne) (all available from, for example, ABCR GmbH & Co. Postfach 210135, Hansastr. 29c, D-76151 Karlsruhe, Germany). A further example are silane-modified phenol-formaldehyde oligomers, of the kind produced and sold as resoles or novolaks by Bakelite AG (Gennaer Straβe2-4, D-58642 Iserlohn-Letmathe).

In a further embodiment of the invention it is also possible as reactive oligomers and/or polymers to use compounds which possess reactive, preferably polymerizable, functional groups. The polymerizable functional groups can be prepared, for example, by a subsequent reaction of the oligomer and/or polymer (as for example by means of a polymer-analogous reaction). These reactive oligomers/polymers react with the functional organic groups of suitable organic network formers and in that way are bonded covalently to or in the inorganic oxide network.

These reactive oligomers and/or polymers may be reactive polymers from the group of the polyacrylates, polymethacrylates, polyethers, polyesters, polyamines, polyamides, polyols, polyurethanes, and polyolefins.

Organic oligomers and/or polymers which can be incorporated via suitable functional groups directly into the hybrid layer are preferably those which possess polymer-chemically compatible functional groups, such as the organic network formers. Thus, in the case of a silane containing epoxy groups, it is preferred to use an epoxy resin or a resin containing amino groups; in the case of silanes containing (meth)acrylic groups it is preferred to use (meth) acrylates, etc. Where the reaction of the functional groups of the organic oligomers/polymers with the reactive groups $R^1$ of the organic network formers takes place by way of condensation mechanisms or addition mechanisms, the functional groups are preferably matched to one another accordingly. For example, epoxide-containing polymers can be reacted particularly well with epoxy-functionalized or amino-functionalized silanes. In this way the polymers are modified by alkoxysilanes and hence can be reacted very well together with, for example, tetraalkoxysilanes to give hybrid inorganic/organic layers.

One example of a prepolymer/preoligomer which can be used in this way is the epoxy resin D.E.R: 330 (Dow Corning; Rheingaustr. 53 in D-65201 Wiesbaden, Germany). Further examples are (epoxycyclohexyl-ethyl)methylsiloxane-dimethylsiloxane copolymer, amino-propylmethylsiloxane-dimethylsiloxane copolymer from ABCR, and also polybutadiene-poly(2,3-epoxy)butadiene copolymer (available from Aldrich, D-89552 Steinheim, Germany).

In a further embodiment of the invention the formation of organic oligomer and/or polymer takes place within an inorganic oxide, by causing only the functional groups of the organic network formers to polymerize with one another. In this way, for example, organic network formers in which the reactive, preferably polymerizable, group $R^1$ are preferably methacrylate, acrylate or vinyl groups are oligomerized or polymerized by addition of suitable polymerization initiators. It is also possible for epoxide-containing silanes, for example, to react with one another prior to incorporation into an oxide network, to form oligomeric/polymeric polyether units. A mixture of suitable epoxy-functionalized and amino-functionalized silanes can react at least partly, prior to incorporation into the hybrid inorganic/organic layer, to form oligomeric/polymeric β-hydroxyamines, and in this way may already form a quasi-two-dimensional organic network. These silane mixtures can then be reacted with the resultant oxide network to form a hybrid inorganic/organic layer.

Hybrid inorganic/organic layers formed in this way may, however, have a lower degree of polymerization in the context of the organic component than if, additionally, organic monomers are copolymerized, i.e., are added additionally during the polymerization.

Preference is therefore given, in a further embodiment of the invention, to the additional use of organic monomers to construct the organic network.

In order to be able reliably to utilize not only the advantageous effects of the organic oligomer and/or polymer but also those of the inorganic oxide network, the organic fraction in the hybrid inorganic/organic layer applied to a platelet-shaped substrate is present preferably in a range from 4% to 85% by weight, more preferably 5% to 75% by weight, and with particular preference 10% to 50% by weight, the % by weight figure being based on the weight of the overall hybrid layer.

Below 4% by weight of the organic component, the advantageous, i.e., elasticity-enhancing effects of the organic oligomer and/or polymer are barely active. On the other hand, above 85% by weight of organic fraction in the hybrid layer, the advantageous, i.e., the abrasion-resistance-enhancing effects of the inorganic component are lost.

These amounts of the organic components can be determined analytically in a simple way, on the basis of the C content of the effect pigment.

In the case of complex layer constructions with further purely organic or inorganic layers, it is advisable, for the analysis of such layers, to employ sputtering techniques in combination with surface-sensitive analytical methods such as ESCA and/or SIMS.

In order to develop the advantageous effects of the hybrid inorganic/organic layer in the sense of mechanical stabilization and/or boosted hydrophobization, the average thickness of the hybrid layer is preferably at least 2 nm, more preferably at least 3 nm, and with particular preference at least 10 nm. Below 2 nm the advantageous effects of the hybrid inorganic/organic layer become barely perceptible.

The hybrid inorganic/organic layer is stabilized mechanically even still at very high layer thicknesses. The thickness of the hybrid inorganic/organic layer is typically located within a range from about 10 nm to 50 nm. The advantageous effects, however, are still present even at a maximum layer thickness of 800 nm, preferably 700 nm, and very preferably 600 nm. Layer thicknesses above these ranges have the effect overall of producing an excessive increase in the thickness of the metallic effect pigments. In that case the orientation capacity of the metallic effect pigments in the application medium, which is critical to the formation of optical effect, is increasingly restricted. Furthermore, with very thick coatings, the opacity of the pigments is adversely affected.

Viewed over the thickness of the layer, the two components of the hybrid inorganic/organic layer may be present in homogeneous distribution or else in inhomogeneous distribution, such as, for example, in the form of a gradient distribution, such that the proportion of the two components alters along the layer thickness. In the case of inhomogeneous distribution of the individual components, the abovementioned limits to the composition of the hybrid layer apply for the average value along the thickness of the hybrid layer. In accordance with the invention, however, a substantially homogeneous, and preferably homogeneous, distribution of inorganic network and organic oligomer and/or polymer is preferred.

The organic oligomers and/or polymers may for example also be present at least partly in the form of nanoparticles in the inorganic network, to form the hybrid inorganic/organic layer. An alternative possibility is for the inorganic oxide component to be present at least partly in the form of nanoparticles in the organic oligomer and/or polymer, to form the hybrid inorganic/organic layer. In accordance with a further variant of the invention the hybrid inorganic/organic layer in the nanoscale range has a substantially homogeneous construction, and so the formation of inorganic nanoparticles in a substantially organic environment of oligomer and/or polymer, or of organic nanoparticles in the form of oligomer and/or polymer in an inorganic environment, is a relatively infrequent occurrence. A homogeneous construction is obtained in particular when using a high fraction of organic network formers when producing the hybrid inorganic/organic layer.

The platelet-shaped substrate is generally composed of commercially available metallic effect pigments. These encompass pure metal pigments, coated metal pigments, and interference pigments comprising metals.

Platelet-shaped substrates are those having a form factor (ratio of the average of the longitudinal extent to the average thickness) of 3 to 10 000, preferably of 5 to 5000, and very preferably of 10 to 4500. The size relationships of the platelet-shaped substrates are characterized by the average ($d_{50}$ value) of the cumulative distribution curve, of the kind typically measured by laser diffraction methods. Preference is given in this context to sizes, i.e., longitudinal extents, having a $d_{50}$ of 2 to 2000 µm, more preferably of 3 to 1000 µm, with further preference of 4 to 200 µm, and with very particular preference of 5 to 100 µm.

The metallic effect pigments are composed of materials such as aluminum, copper, iron, zinc, tin, titanium, chromium, silver, cobalt, nickel, antimony, magnesium, zirconium, and silicon, and their alloys. Preferred alloys are gold bronzes (brass), and in addition it is likewise possible to use steel and stainless steel pigments. In the case of pure metals, i.e., of metals with an ultrapure fraction >98% by weight, aluminum, copper, and iron are preferred.

Particularly preferred are platelet-shaped substrates of aluminum, brass (gold bronzes), and also iron pigments produced from (reduced) carbonyl iron pellets, of the kind described in accordance with the teaching of DE 101 14 446 A1.

These substrates possess longitudinal extents of 1 to 1000 µm, preferably of 5 to 100 µm. The average thicknesses are 30 to 2000 nm, preferably 70 to 800 nm, and more preferably 150 to 500 nm. Very thin aluminum pigments produced by wet grinding processes are described in DE 103 15 755 A1, for example, which is hereby incorporated by reference.

The metal pigments can be produced both by conventional technologies such as the wet or dry grinding of corresponding metal pellets, or by PVD (physical vapor deposition) belt coating processes, of the kind described in U.S. Pat. No. 4,321,087, for example. In the latter case the metal pigment, after it has been detached from the belt and mechanically comminuted to pigments, can be provided with a hybrid inorganic/organic layer. In this way these pigments can be mechanically stabilized and protected from corrosive influences.

Further suitable platelet-shaped substrates are coated metal pigments. In this context mention may be made, for example, of aluminum pigments coated with iron oxide (trade name: "Paliocrom®", BASF, Ludwigshafen, Germany), chromated aluminum pigments (trade name: "Hydrolux", Eckart), oxidized aluminum pigments (trade name: "Aloxal", Eckart), aluminum pigments coated with titanium oxide, and iron pigments provided with oxide layers [DE 101 14 445 A1].

Particularly preferred are aluminum pigments coated with iron oxide (trade name: "Paliocrom®"). These are metal pigments which have been coated with a purely inorganic iron oxide layer.

Pigments with very high weathering stability are obtained by using chromated aluminum pigments as a substrate. These pigments can be used in exterior architecture as IR-reflecting pigments. In this case the high reflection of aluminum pigments in the infrared range is utilized to produce heat-insulating external architectural coatings. When used in external architecture, however, the pigments must also withstand extreme conditions. It has surprisingly emerged that the metallic effect pigments of the invention with a hybrid inorganic/organic layer are outstandingly suitable for use in protecting facades.

In a further development in accordance with the invention the organically/inorganically modified layer is additionally modified through the use of network modifiers. In contrast to the organic network formers, network modifiers do not form organic oligomers/polymers, and polymerize neither with added organic monomers nor with one another.

Organic network modifiers are reagents which contain not only at least one hydrolyzable group but also at least one organic group, which need not necessarily, however, be reactive or polymerizable. Organic network modifiers are preferably compounds of the general formula (III)

(III)

where X is a hydrolyzable group after whose hydrolysis a covalent bond of organic network modifier to the inorganic network can be formed,
and $R^1$, $R^2$, and $R^3$ independently of one another are each a nonreactive organic group, with the proviso that n, m and o are integers, where n+m+o=1–3 and n=1 to 3, m=0 to 2, and o=0 to 2,
and/or of the general formula (IV)

(IV)

where the compound has at least one hydrolyzable group X after whose hydrolysis a covalent bond of organic network modifier to the inorganic network can be formed, and has at least one nonreactive organic radical $R^4$, where
k is the formal oxidation number of M,
M is Al, Zr or Ti, and
p is an integer from 1 to (k−1).

The hydrolyzable or condensable group X of the organic network modifiers is preferably selected from the group consisting of halogen, hydroxyl or alkoxy having 1-10 C atoms, which may be linear or branched.

The organically functionalized groups $R^1$, $R^2$ and $R^3$ are preferably selected from the group consisting of H, alkyl, alkenyl, alkynyl, aryl, alkylaryl, arylalkyl, alkenylaryl, arylalkynyl, alkynylaryl, cycloalkyl, alkylcycloalkyl, cycloalkylalkyl, amino, hydroxyl, thiol, mercaptan, fluorinated alkyl, partly fluorinated alkyl, (partly) fluorinated aryl, (partly) fluorinated alkylaryl, acrylate, methacrylate, vinyl, epoxy, carboxyl, and ester group. The radicals $R^1$, $R^2$, and $R^3$ preferably have chain lengths with 3 to 20 carbon atoms, more preferably with 5 to 15 carbon atoms. The radicals $R^1$, $R^2$, and $R^3$ may be cyclic, branched and/or linear and may contain heteroatoms such as O, S, and N in the carbon chain or in the carbon ring system. With regard to the length of the functional groups $R^1$, $R^2$, and $R^3$, reference is made accordingly to the observations relating to the organic network former.

The above-recited functionalities of the organic network modifiers are in some cases identical with those also used as organic network formers. The difference is that in this case the functionalities are not intended to react with one another or with organic monomers or polymers. This is the case when, in terms of their chemical reactivity, the functionalities of $R^1$, $R^2$, and $R^3$ are different from the functionalities of the monomers or else from those of the organic oligomers and/or polymers. Accordingly, through a choice of network modifier and suitable monomers, the reaction can be controlled in such a way that there is no reaction of network modifiers with one another or with the monomers.

If, for example, exclusively a mixture of organofunctional silanes is used to construct the organic component, i.e., the organic oligomer and/or polymer, of the hybrid layer, then all organofunctional silanes whose functional groups do not react with one another function as organic network modifiers.

Organofunctional silanes suitable as pure organic network modifiers are, in particular, compounds without functionalities having pronounced chemical reactivity. These are, in particular, $(C_1-C_{40})$alkyl, $(C_6-C_{36})$aryl, and also perfluorinated or partly fluorinated $(C_1-C_{40})$alkyl and/or $(C_6-C_{40})$aryl functionalities as radicals $R^1$, $R^2$, and $R^3$. The alkyl radicals may be linear, branched or cyclic. Examples are: propyltri(m)ethoxysilane, octyltri(m)ethoxysilane, dodecyltri(m)ethoxysilane, octadecyltri(m)ethoxysilane, phenyltri(m)ethoxysilane, diphenyldi(m)ethoxysilane, perfluorooctyltri(m)ethoxysilane, 1-,1-,2-,2-,3-,3-,4-, 4-fluorooctyltri(m)ethoxysilane, 5-,5-,6-,6-,7-,7-,8-, 8,8-fluorooctyltri(m)ethoxysilane, 1H—,1H—,2H—,2H-perfluorooctyltriethoxysilane (Dynasylan F 8261).

Examples of organic network modifiers with Ti, Zr or Al as central atom are (see Ken-React Reference Manual-Titanate, Zirconate and Aluminate Coupling Agents by Salvatore J. Monte, expanded edition Summer 1993): isopropyltriisostearyltitanate(IV) (KR TTS), isopropyl-tri(dioctyl)phosphatotitanate(IV) (KR 12), isopropyl-tri(dodecyl)benzenesulfonyltitanate(IV) (KR 9S), iso-propyltri(dioctyl)pyrophosphatotitanate(IV) (KR 38S), di(dioctyl) phosphatoethylenetitanate(IV) (KR 212), di(dioctyl) pyrophosphatoethylenetitanate(IV) (KR 238S), di(dioctyl) pyrophosphatooxoethylenetitanate(IV) (KR 138S), diisobutyl(stearyl)acetoacetylaluminate (KA 301).

With further developments of the invention the substrates may first be provided with one or more coatings which are either only inorganic or only organic in nature, before the hybrid layer is applied. The preparation of such purely inorganic or purely organic layers is very well known to the skilled worker.

In additional developments of the invention further purely inorganic and/or purely organic coatings may be applied to the hybrid inorganic/organic layers. The preparation of such coats is likewise very well known to the skilled worker.

The thicknesses of the purely inorganic or organic layers are preferably between 3 and 1000 nm, more preferably between 4 and 800 nm, with particular preference between 5 and 500 nm, and with very particular preference between 7 and 50 nm.

"Purely inorganic" layers here are layers having an organic fraction of below 4% by weight. "Purely organic" layers are layers having an inorganic fraction of below 4% by weight. The above amounts in % by weight refer in each case to the weight of the respective layer.

The reaction conditions for the coating with purely inorganic or organic layers before or after the application of the hybrid layer may possibly differ from those needed for forming the hybrid layer. Thus, for example, the reaction temperature, the solvent or the pH may be changed. This may, where appropriate, require termination of the reaction before or after the precipitative application of the hybrid inorganic/organic layer to the substrate, and the processing of the precursor, by means of filtration and drying under vacuum, for example. Preferably, however, coating with a purely inorganic layer and/or a purely organic layer is carried out in the same medium as the coating with the hybrid inorganic-organic layer, as a one-pot reaction.

It has been found, surprisingly, that the performance advantages of the increased mechanical stability and the improved corrosion protection of the hybrid inorganic/organic layer are largely independent of whether there are further purely organic or purely inorganic layers present between substrate and hybrid layer and/or on the hybrid layer itself. It can be of advantage when coating first to begin only with the inorganic component. In this way it is possible to bring about better adhesion of the subsequent hybrid layer on the substrate. This is the case especially when the hybrid layer has very hydrophobic constituents, such as organic fluorinated functionalities, for example.

A further coating of the hybrid layer with a, for example, pure oxide layer is likewise advantageous. In certain circumstances a desired surface modification can be carried out more effectively on this oxide layer than may be the case on the hybrid layer. This is especially so when the hybrid layer has very hydrophobic constituents and/or has a very high fraction of organic oligomer and/or polymer (e.g., >20% by weight).

In the case of a purely inorganic coating of metal oxides/hydroxides, the latter are selected from oxides, metal oxide hydrates, suboxides and/or hydroxides of the elements from the group consisting of silicon, titanium, aluminum, zirconium, iron, copper, tin, cobalt, chromium, cerium, nickel, tin, vanadium, tantalum, yttrium, molybdenum, tungsten, and mixtures thereof. The precipitation of such a layer on metallic effect pigments is very well known to the skilled worker. It proceeds in accordance with the following general process:

(a) The platelet-shaped substrate is dispersed in a solvent and the suspension is brought to reaction temperature.
(b) Then one or more metal compounds of the formula $MX_n$ are added, a suitable pH range is set by addition of suitable acids or bases, and, where appropriate, water is added. M, X and n here have the same definitions as given above. Furthermore, M may additionally be Cu, Co, Ni, Sn, V, Ta, Y, Mo and/or W. Where appropriate the oxide layer can also be precipitated onto the hybrid inorganic/organic layer in the same solvent, following the deposition of the hybrid inorganic/organic layer.
(c) Finally the reaction is continued for a certain time at the reaction temperature and then cooled to room temperature. The product is subsequently separated from the solvent.

A purely organic coating may be composed, for example, of poly(meth)acrylates, polyesters, polyurethanes, polyols, polyethers or polyamides. The precipitation of such a layer on metallic effect pigments is likewise very well known to the skilled person. It proceeds in accordance with the following general process:

(a) The platelet-shaped substrate is dispersed in a solvent and the suspension is brought to reaction temperature.
(b) Then one or more organic monomers and, where appropriate, polymerization initiators are added, possibly dropwise, to form an organic polymer layer. Prior to the application of the organic polymer layer it is possible, optionally, to add a suitable adhesion promoter, in order to ensure better attachment of the polymer to the surface of the metallic effect pigment [in the way known from DE 40 30 727].
(c) The coated pigment, finally, is separated from the reaction medium.

In further developments of the invention the metallic effect pigments which have a hybrid inorganic/organic layer may be provided with a surface modifier. Examples of such surface modifiers are already known from DE 198 20 112. This surface modifier can be used to make the metallic effect pigments compatible, in terms of their performance properties, with the particular application medium used: for example, a varnish or a printing ink.

An improvement in the corrosion protection properties of a coating or in the mechanical stabilization cannot, however, be achieved solely by means of a surface modification.

Where appropriate, the addition of the surface modifier may also take place following the precipitation of the hybrid inorganic/organic layer, or the precipitation of one or more further inorganic layers, in the same solvent. It is also possible to dissolve the surface modifier in a suitable solvent and then apply it in a mixer to the metallic effect pigments. Another possibility is to apply the surface modifier, where appropriate in dry form, to the metallic effect pigments of the invention, such as by means of spray drying, for example.

The process of the invention for producing metallic effect pigments with a hybrid inorganic/organic layer comprises, in one variant, the following steps:

(a) providing a reaction mixture of platelet-shaped metallic substrates in a liquid phase,
(b1) adding at least one inorganic network former to the reaction mixture from step (a),
(c1) hydrolyzing and/or condensing the inorganic network former added in step (b1),
(d1) adding at least one reactive organic network former and at least one reactive organic component before, during and/or after the hydrolysis and/or condensation of step (c1),
or
(b2) adding at least one reactive organic network former and at least one reactive organic component to the reaction mixture from step (a),
(c2) adding at least one inorganic network former to the reaction mixture from step (b2),
(d2) hydrolyzing and/or condensing the inorganic network former added in step (c2),
and
(e) reacting hydrolyzed and/or condensed inorganic network former with the reactive organic network former and also with the reactive organic component, with simultaneous and/or subsequent deposition of a hybrid inorganic/organic layer to the platelet-shaped substrates, the hybrid layer having at least partly an inorganic network that has one or more inorganic oxide components, and at least one organic component, the organic component being at least partly an organic oligomer and/or polymer which is at least partly covalently bonded to the inorganic network,
(f) optionally separating the platelet-shaped substrates coated in step (e) from the reaction mixture.

According to one variant, therefore, the process of the invention can be carried out on the basis of steps (a), (b1), (c1), (d1), (e), and (f), or on the basis of steps (a), (b2), (c2), (d2), (e), and (f).

The at least one reactive organic component is preferably added in the form of reactive polymerizable organic monomers, oligomers and/or polymers.

Furthermore it is preferred to add at least one reactive oligomer and/or polymer as the reactive organic component.

According to one preferred development of the process of the invention the reactive oligomer and/or polymer is selected from the group consisting of polyacrylates, polymethacrylates, polyethers, polyesters, polyamines, polyamides, polyols, polyurethanes, polyolefins, and mixtures thereof, and for activation is optionally reacted with an organic network former prior to the addition to the reaction mixture or to the liquid phase.

It is further preferred for the reactive organic component to be formed prior to addition, by reacting one or more different organic network formers with reactive groups $R^1$ with one another, optionally with addition of polymerization initiators, and subsequently carrying out addition.

Preferably the reactive organic oligomer and/or polymer is selected from the group consisting of silanol- and/or methoxy-terminated silicones, trialkoxysilane-modified polyethyleneimines, polyarylalkylsilasesquioxanes, aminosilane-modified polyethylene oxide urethanes.

According to one further variant of the process of the invention the reactive organic oligomer and/or polymer is selected from the group consisting of polyacrylates, polymethacrylates, polyethers, polyesters, polyamines, polyamides, polyols, polyurethanes, and polyolefins, these oligomers and/or polymers possessing reactive, nonpolymerized functions.

In one further variant of the process of the invention, before, during and/or after the addition of the reactive organic component, additionally at least one organic network modifier is added.

For the rest, with regard to the process of the invention, reference is made accordingly to the observations relating to the metallic effect pigments of the invention.

As the liquid phase it is possible to use aqueous and/or organic solutions. Preference is given to organic solutions in the form of alcoholic solutions which possess a water content of 1% to 80% by weight, preferably 2% to 20%, and more preferably 3% to 10% by weight. A water content of at least 1% by weight is needed in order to hydrolyze the organic and inorganic network formers. The % by weight figure is based in each case on the total weight of the solvent.

Organic solvents which can be used are all customary solvents such as alcohols, ethers, ketones, esters, glycols or hydrocarbons or mixtures thereof. Preferred alcohols used are, for example, methanol, ethanol, n-propanol, isopropanol, n-butanol or 2-butanol or mixtures thereof.

Steps (b) to (e) of the coating reaction take place at reaction temperatures in a range from approximately 0° C. to approximately 100° C., preferably from approximately 10° C. to approximately 80° C. The reaction temperatures are limited by the boiling point of the solvent or solvent mixture that is used.

The pH in steps (b) to (e) is located within a range from 3 to 12, preferably from 7 to 10. The pH must not be too acidic or alkaline, since the metal pigments are corroded by the water used for the reaction. Preference is therefore given to neutral to slightly alkaline pH levels.

After the optional step (f) it is possible for the inventively coated metal pigments to be subjected to a size classification, as by sieving, for example. Moreover, they can be dried out in a suitable assembly. After the pigments have been separated from the reaction mixture it is possible to switch the solvent, adding a solvent other than that used for the reaction to the dried pigment powder. In this way pastes can be prepared which have a metal pigment content of 50% to 90% by weight, preferably of 60% to 75% by weight, the % by weight figure being based on the weight of the paste.

The inventively coated metallic effect pigments find use in varnishes, paints, printing inks, powder coating materials, plastics, security printing inks, glass, ceramic, architectural coatings or cosmetics.

The pigments of the invention were investigated for their gassing stability following severe mechanical loading in a laboratory kneader.

For these investigations the following test methods were used:

Yellow Iron Oxide Gassing Test 38.8 g of metal pigment powder were combined with about 40 g of a commercially available basecoat varnish and 41 g of a yellow aqueous tinting paste containing iron oxide pigments. Then 240 g of basecoat varnish were added and the mixture was dispersed for 30 minutes using a toothed dissolver disk (œ50 mm) at 2000 rpm. The aqueous paint was then introduced into a wash bottle, which had been given a twin-chamber gas bubble counter, and was heated at 40° C. The volume of gas evolved could be read off from the level, in mm, in the twin-chamber gas bubble counter. The gas level was read off after 7, 14, 21, and 28 days. The test was passed when no more than 20 mm of hydrogen were evolved after 28 days.

Laboratory Kneader Treatment 100 g of pigment were made up with isopropanol to form a paste with a solids content of 65%. This paste was kneaded in a high-performance laboratory kneader (from IKA) at room temperature for 5 minutes. The high viscosity of these metallic effect pigment pastes allows extremely high shearing forces to act on the pigments by means of the mechanical influence of the duplex kneading vanes. Subsequently the metallic pigment paste thus treated was subjected to the gassing test described above, for which the solvent content of the paste is taken into account with regard to the initial mass.

The working examples which follow are intended to illustrate the invention, but without restricting it.

EXAMPLES

Example 1

95 g of Paliocrom L 2000 (BASF) are dispersed in 310 ml of isopropanol and the dispersion is heated to the boiling point. Then 9 g of tetraethoxysilane are added and, a short time later, 9 g of $H_2O$. Subsequently a 25% strength aqueous $NH_4OH$ solution is introduced via an automatic metering unit over a period of 3 h at a rate such that, during this time, a pH of 8.7 is attained and maintained. 1 h after the beginning of this metered addition, solution A (see below) is also metered in continuously using a laboratory automatic metering unit (STEPDOS from IKA) over a period of 85 min. 5 min after the beginning of this feed, the polymerization is initiated by adding a spatula tip of 2,2'-azobis (isobutyronitrile) (AIBN). The reaction mixture is then left with stirring at 88° C. for 4 h. Subsequently a mixture of 0.8 g of Dynasylan OCTEO and 0.5 g of Dynasylan AMMO is added. The reaction mixture is stirred overnight and filtered the next day. The filtercake is dried in a vacuum drying cabinet at 100° C. for 6 h.

Solution A: 0.59 g of Dynasylan MEMO and 2.51 g of trimethylolpropane trimethacrylate (TMPTMA) in solution in 116 ml of ethanol.

Example 2

Preparation as in example 1, but using ethanol instead of isopropanol as solvent.

Example 3

Preparation as in example 1, but using the following solution B:

0.59 g of Dynasylan MEMO, 2.51 g of TMPTMA and 0.5 g of lauryl methacrylate in solution in 116 ml of ethanol.

Example 4

Preparation as in example 2, but using the following solution C:

0.59 g of Dynasylan MEMO, 2.51 g of TMPTMA and 0.5 g of ethylene glycol dimethacrylate (EGDMA) in solution in 116 ml of ethanol.

Example 5

Preparation as in example 1, but using the following solution D:

0.59 g of Dynasylan MEMO, 2.51 g of TMPTMA and 0.47 g of allyl methacrylate in solution in 116 ml of isopropanol.

Example 6

Preparation as in example 2, but using the following solution E:

1.0 g of Dynasylan MEMO, 5.2 g of TMPTMA in solution in 116 ml of ethanol.

Example 7

Preparation as in example 1, but using the following solution F:

1.0 g of Dynasylan MEMO, 9.8 g of TMPTMA in solution in 116 ml of isopropanol.

Example 8

Preparation as in example 2, but without using 2,2'-azobis (isobutyronitrile) (AIBN) as initiator, and using the following solution G:

1.0 g of Dynasylan GLYMO, 2.0 g of 1,6-hexamethylenediamine and 0.5 g of pentaerythritol polyglycidyl ether in solution in 116 ml of ethanol.

Example 9

Preparation as in example 1, but without using 2,2'-azobis (isobutyronitrile) (AIBN) as initiator, and using the following solution H:

1.0 g of Dynasylan GLYMO, 2.0 g of 1,6-hexamethylene-diamine and 0.5 g of trimethylolpropane triglycidyl ether in solution in 116 ml of isopropanol.

Example 10

Preparation as in example 1, but without using 2,2'-azobis(isobutyronitrile) (AIBN) as initiator, and using the following solution I:
3.0 g of epoxy resin D.E.R: 330 in solution in 100 g of isopropanol.

Example 11

Preparation as in example 1, but without using 2,2'-azobis(isobutyronitrile) (AIBN) as initiator, and using the following solution J:
4.5 g of epoxy resin D.E.R: 330 in solution in 100 g of isopropanol.

Example 12

Preparation as in example 1, but without using 2,2'-azobis(isobutyronitrile) (AIBN) as initiator, and using the following solution K:
3.0 g of dimethyldiphenylsiloxane (silanol terminated copolymer) (No. PS084, ABCR) in solution in 100 g of isopropanol.

Example 13

Preparation as in example 3, but operating at a pH of 8.4.

Example 14

Preparation as in example 4, but operating at a pH of 8.4.

Example 15

Preparation as in example 5, but operating at a pH of 8.7.

Example 16

Preparation as in example 6, but operating at a pH of 8.4 and using as the base, instead of NH$_4$OH, a solution of 2.4 g of methylamine in 20 ml of isopropanol.

Example 17

Preparation as in example 6, but operating at a pH of 8.7 and using as the base, instead of NH$_4$OH, a solution of 2.4 g of methylamine in 20 ml of isopropanol.

Comparative example 18 (SiO$_2$ coating only)

95 g of Paliocrom L 2000 are dispersed in 310 ml of isopropanol and the dispersion is heated to the boiling point. Then 20 g of tetraethoxysilane are added and, after a short time, 13 g of H$_2$O. Subsequently a 25% strength aqueous NH$_4$OH solution is introduced via a Dosimat over a period of 3 h at a rate such that, during this time, a pH of 8.7 is attained and maintained. Subsequently the reaction is continued for a further 3 h and then a mixture of 1 g of Dynasylan OCTEO and 0.5 g of Dynasylan AMMO is added. The reaction mixture is stirred overnight and filtered off with suction the next day. The filtercake is dried in a vacuum drying cabinet at 100° C. for 6 h.

The gassing over time is shown in table 1.

TABLE 1

Gassing tests on different Paliocrom samples

| Sample | Gassing in mm after | | | |
|---|---|---|---|---|
|  | 7 d | 14 d | 21 d | 28 d |
| Example 1 | 1 | 5 | 11 | 11 |
| Example 1 after laboratory kneader | 2 | 3 | 3 | 3 |
| Example 2 after laboratory kneader | 3 | 3 | 4 | 5 |
| Example 3 after laboratory kneader | 4 | 4 | 6 | 7 |
| Example 4 after laboratory kneader | 3 | 3 | 4 | 5 |
| Example 5 after laboratory kneader | 4 | 4 | 5 | 5 |
| Example 6 after laboratory kneader | 3 | 3 | 4 | 5 |
| Example 7 after laboratory kneader | 3 | 4 | 5 | 6 |
| Example 8 after laboratory kneader | 5 | 5 | 7 | 8 |
| Example 9 after laboratory kneader | 6 | 6 | 7 | 7 |
| Example 10 after laboratory kneader | 9 | 9 | 10 | 11 |
| Example 11 after laboratory kneader | 7 | 7 | 8 | 9 |
| Example 12 after laboratory kneader |  |  |  |  |
| Example 13 after laboratory kneader | 3 | 4 | 4 | 5 |
| Example 14 after laboratory kneader | 3 | 3 | 5 | 5 |
| Example 15 after laboratory kneader | 4 | 5 | 6 | 6 |
| Example 16 after laboratory kneader | 3 | 4 | 4 | 5 |
| Example 17 after laboratory kneader | 4 | 4 | 6 | 7 |
| Comp. example 18 | 0 | 0 | 0 | 1 |
| Comp. example 18 after treatment in laboratory kneader | <1 d!! | — | — | — |

Nb: All inventive examples passed the gassing test without treatment in the laboratory kneader.

All of the inventively coated examples passed the gassing test even after treatment in the laboratory kneader. The SiO$_2$-coated metal pigments of comparative example 18, in contrast, did not pass the gassing test for even one day following shearing treatment in the laboratory kneader. Since the unsheared pigment passed the gassing test with virtually no measurable evolution of gas, this shows that metal pigments provided exclusively with an inorganic coating are indeed excellent in terms of the gassing stability, but are very unsatisfactory in terms of the mechanical stability.

What is claimed is:

1. Metallic effect pigments with coating, comprising a platelet-shaped substrate, wherein the coating comprises at least one hybrid inorganic/organic layer having an average thickness of at least 10 nm, the hybrid layer having at least partly an inorganic network that has one or more inorganic oxide components, and having at least one organic component, the organic component being at least partly an organic oligomer and/or polymer which is covalently bonded at least partly to the inorganic network via one or more organic network formers, wherein the at least partial covalent bonding of inorganic oxide component and organic oligomer and/or polymer is accomplished at least partly through one or more organic network formers of the general formula (I)

$$R^1{}_n R^2{}_m R^3{}_o SiX_{(4-n-m-o)} \qquad (I)$$

where X is a hydrolyzable group after whose hydrolysis a covalent bond of organic network former to the inorganic network can be formed and R$^1$ is a reactive organic group which covalently bonds to the organic oligomer and/or polymer, $R^2$ and $R^3$ independently of one another is an organic group which is covalently bonded to the organic oligomer and/or polymer, or $R^2$ and $R^3$ independently of one another are non-reactive, with the proviso that n, m and o are integers, with n+m+o=1 to 3 and n=1 to 3, m=0 to 2, and o=0 to 2.

2. The metallic effect pigments of claim 1, wherein the inorganic oxide component of the hybrid layer is selected from the group consisting of metal oxide, metal suboxide, metal hydroxide, metal oxide hydrate, and mixtures thereof.

3. The metallic effect pigments of claim 2, wherein the inorganic oxide component of the hybrid layer is selected from metal oxide and/or metal suboxide and/or metal hydroxide and/or metal oxide hydrate of elements from the group consisting of silicon, aluminum, titanium, zirconium, iron, cerium, chromium, manganese, zinc, tin, antimony, boron, magnesium, and mixtures thereof.

4. The metallic effect pigments of claim 1, wherein the organic network former is a silane of the general formula (I), the hydrolyzable group(s) X being selected independently of one another from the group consisting of halogen, hydroxyl, alkoxy having 1-10 C atoms, which may be straight-chain or branched, and mixtures thereof.

5. The metallic effect pigments of claim 1, wherein $R^1$ is a reactive organic radical which has one or more substituents selected from the group consisting of amino, hydroxyl, thiol, epoxy, acrylate, methacrylate, vinyl, allyl, alkenyl, alkynyl, carboxyl, carboxylic anhydride, isocyanate, cyanate, ureido, and carbamate group and mixtures thereof.

6. The metallic effect pigments of claim 1, wherein $R^2$ and $R^3$ are selected independently of one another from the group consisting of H—, $(C_1-C_{40})$-alkyl-, $(C_1-C_{40})$-fluorinated alkyl-, $(C_1-C_{40})$-partially fluorinated alkyl-; $(C_2-C_{40})$-alkenyl-, $(C_2-C_{40})$-alkynyl-; $(C_6-C_{36})$-aryl-, fluorinated $(C_6-C_{36})$-aryl-, partially fluorinated $(C_6-C_{36})$-aryl-; $(C_7-C_{40})$-alkylaryl-, $(C_7-C_{40})$-arylalkyl-, fluorinated $(C_7-C_{40})$-alkylaryl-, partially fluorinated $(C_7-C_{40})$-alkylaryl-; $(C_8-C_{40})$-alkenylaryl-, $(C_8-C_{40})$-arylalkynyl-, -; $(C_8-C_{40})$-alkynylaryl-; $(C_5-C_{40})$-cycloalkyl-, $(C_6-C_{40})$-alkylcycloalkyl-, $(C_6-C_{40})$-cycloalkylalkylsilanes each of which may be substituted by amino, hydroxyl, thiol, epoxy, acrylate, methacrylate, vinyl, allyl, alkenyl, alkynyl, carboxyl, carboxylic anhydride, isocyanate, cyanate, ureido, carbamate and/or ester group and may contain 0, N, and S as heteroatoms in the carbon chains and carbon ring systems, and mixtures thereof.

7. The metallic effect pigments of claim 1, wherein the oligomer and/or polymer is constructed from organic monomers provided with functionalities from the group consisting of amino, hydroxyl, thiol, epoxy, acrylate, methacrylate, vinyl, allyl, alkenyl, alkynyl, carboxyl, carboxylic anhydride, isocyanate, cyanate, ureido, and carbamate group and mixtures thereof.

8. The metallic effect pigments of claim 1, wherein the organic component is constructed from reactive organic oligomers and/or polymers which have reactive groups which are able to attach to the inorganic network and/or at least to the group $R^1$ of the organic network formers.

9. The metallic effect pigments of claim 8, wherein the reactive organic oligomer and/or polymer is selected from the group consisting of silanol- and/or methoxy-terminated silicones, trialkoxysilane-modified polyethyleneimines, polyarylalkylsilasesquioxanes, aminosilane-modified polyethylene oxide urethanes, and mixtures thereof.

10. The metallic effect pigments of claim 8, wherein the reactive organic oligomer and/or polymer is selected from the group consisting of polyacrylates, polymethacrylates, polyethers, polyesters, polyamines, polyamides, polyols, polyurethanes, and polyolefins, these oligomers and/or polymers having reactive functional groups which are able to bond to the inorganic network or an organic network former.

11. The metallic effect pigments of claim 1, wherein the organic oligomer and/or polymer is covalently bonded via the functional groups $R^1$ of one or more organic network formers in the hybrid inorganic/organic layer.

12. The metallic effect pigments of claim 1, wherein the hybrid inorganic/organic layer is additionally modified by one or more organic network modifiers having the general formula (III)

$$R^1{}_n R^2{}_m R^3{}_o SiX_{(4-n-m-o)} \quad (III)$$

where X is a hydrolyzable group after whose hydrolysis a covalent bond of organic network modifier to the inorganic network can be formed, and $R^1$, $R^2$, and $R^3$ independently of one another are each a nonreactive organic group, with the proviso that n, m and o are integers, where n+m+o=1 to 3 and n=1 to 3, m=0 to 2, and o=0 to 2, and/or by one or more organic network modifiers having the general formula (IV)

$$R^4{}_p MX_{(k-p)} \quad (IV)$$

where the compound has at least one hydrolysable group X after whose hydrolysis a covalent bond of organic network modifier to the inorganic network can be formed, and has at least one nonreactive organic radical $R^4$, where k is the formal oxidation number of M, M is Al, Zr or Ti, and p is an integer from 1 to (k−1).

13. The metallic effect pigments of claim 1, wherein the platelet-shaped substrate is composed of metals or metal compounds selected from the group consisting of aluminum, copper, iron, zinc, tin, titanium, chromium, cobalt, silver, nickel, antimony, magnesium, zirconium, silicon, and mixtures and alloys thereof.

14. The metallic effect pigments of claim 13, wherein the platelet-shaped substrates consist essentially of iron and wherein said substrates are produced from reduced carbonyliron.

15. The metallic effect pigments of claim 1, wherein disposed between the substrate and the hybrid inorganic/organic layer is at least one separate layer consisting essentially of an inorganic material and/or at least one separate layer consisting essentially of an organic polymer.

16. The metallic effect pigments of claim 1, wherein disposed on the hybrid inorganic/organic layer there is at least one separate layer consisting essentially of an inorganic material and/or at least one separate layer consisting essentially of an organic polymer.

17. The metallic effect pigments of claim 15, wherein at least one separate layer consisting essentially of an inorganic material is composed of metal oxide and/or metal oxide hydrate and/or metal suboxide and/or metal hydroxide and/or metal peroxide of elements selected from the group consisting of silicon, titanium, aluminum, zirconium, iron, copper, tin, cobalt, chromium, cerium, zinc, antimony, manganese, nickel, yttrium, molybdenum, vanadium, tantalum, tungsten, and mixtures thereof.

18. The metallic effect pigments of claim 15, wherein at least one separate layer consisting essentially of an organic polymer is selected from the group consisting of polyacrylate, polymethacrylate, polyether, polyester, polyamine, polyamide, polyol, polyurethane, polyphenolformaldehyde, polyolefin, poly-1,2,3,4-tetrafluoroethylene, and mixtures thereof.

19. The metallic effect pigments of claim 1, wherein an additional layer with one or more surface modifiers has been applied to the surface of the coated metallic effect pigments.

20. The metallic effect pigments of claim 1, wherein an organic fraction in the hybrid inorganic/organic layer is in a range of from 4% to 85% by weight, based on the weight of the entire hybrid layer.

21. The metallic effect pigments of claim 1, wherein the organic oligomers of the hybrid layer have a linking of two to twenty monomer units.

22. The metallic effect pigments of claim 1, wherein the organic polymers of the hybrid layer have a linking of more than twenty monomer units.

23. The metallic effect pigments of claim 1, wherein the hybrid layer is formed with mutual interpenetration of the inorganic network and the organic oligomers and/or polymers.

24. The metallic effect pigments of claim 13, wherein the platelet-shaped substrate is composed of metals or metal compounds selected from the group consisting of gold bronzes, brass, stainless steel and steel.

* * * * *